United States Patent
Li et al.

(10) Patent No.: US 9,507,539 B2
(45) Date of Patent: *Nov. 29, 2016

(54) PERFORMING AUTHORIZATION CONTROL IN A CLOUD STORAGE SYSTEM

(71) Applicant: International Business Machines Corporation, Armonk, NY (US)

(72) Inventors: Ying Li, Beijing (CN); Xin Hui Li, Beijing (CN); Jing Luo, Beijing (CN); Lin Luo, Beijing (CN)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 14/827,280

(22) Filed: Aug. 15, 2015

(65) Prior Publication Data

US 2016/0041784 A1 Feb. 11, 2016

Related U.S. Application Data

(63) Continuation of application No. 13/407,718, filed on Feb. 28, 2012, now Pat. No. 9,134,912, which is a continuation of application No. 13/096,589, filed on Apr. 28, 2011, now Pat. No. 9,158,465.

(51) Int. Cl.
*G06F 3/06* (2006.01)
*G06F 21/62* (2013.01)
(Continued)

(52) U.S. Cl.
CPC .......... *G06F 3/0622* (2013.01); *G06F 3/064* (2013.01); *G06F 3/067* (2013.01); *G06F 3/0643* (2013.01);
(Continued)

(58) Field of Classification Search
CPC .... G06F 3/0622; G06F 3/067; G06F 21/805; H04L 63/102
USPC .............................................. 726/26; 707/698
See application file for complete search history.

(56) References Cited

U.S. PATENT DOCUMENTS

| | | | |
|---|---|---|---|
| 2006/0120526 A1 | 6/2006 | Boucher | |
| 2008/0192052 A1* | 8/2008 | Ljung | ........... G06T 3/4007 345/426 |

(Continued)

FOREIGN PATENT DOCUMENTS

| | | |
|---|---|---|
| CN | 1790218 | 6/2006 |
| CN | 101196971 | 6/2008 |
| CN | 101605148 | 12/2009 |

OTHER PUBLICATIONS

Tiwari, "A Novel Secure Cloud Storage Architecture Combining Proof of Retrievability and Revocation", Apr. 2015, IEEE, p. 438-445.*

*Primary Examiner* — Morshed Mehedi
*Assistant Examiner* — Gregory Lane
(74) *Attorney, Agent, or Firm* — Steven M. Greenberg, Esq.; CRGO LAW

(57) ABSTRACT

A method, apparatus and computer program product for performing authorization control in a cloud storage system. The method comprises: receiving an access request to a file block, wherein the file block is embedded with tag data comprising at least file block authorization information; retrieving the file block; extracting the file block authorization information from the tag data; determining whether the access request matches the file block authorization information; and performing the access request if the access request matches the file block authorization information. Effective authorization control may be performed in a cloud storage system.

24 Claims, 6 Drawing Sheets

(51) Int. Cl.
*G06F 21/80* (2013.01)
*H04L 29/08* (2006.01)
*H04L 29/06* (2006.01)

(52) U.S. Cl.
CPC ............ *G06F 21/6218* (2013.01); *G06F 21/80* (2013.01); *G06F 21/805* (2013.01); *H04L 67/1097* (2013.01); *G06F 2221/2143* (2013.01); *H04L 63/102* (2013.01)

(56) References Cited

U.S. PATENT DOCUMENTS

| | | | |
|---|---|---|---|
| 2008/0310717 | A1 | 12/2008 | Saathoff et al. |
| 2010/0169458 | A1* | 7/2010 | Biderman .......... H04N 7/17318 709/219 |
| 2010/0257146 | A1* | 10/2010 | Memon .................. G06F 3/061 707/693 |
| 2011/0246433 | A1* | 10/2011 | Sun .................. G06F 17/30067 707/698 |

* cited by examiner

PERFORMING AUTHORIZATION CONTROL IN A CLOUD STORAGE SYSTEM

CROSS-REFERENCE TO RELATED APPLICATIONS

This application claims priority under 35 U.S.C. §119(a) to Chinese Patent Application Serial Number 201010163305.6, filed Apr. 29, 2010, entitled "PERFORMING AUTHORIZATION CONTROL IN A CLOUD STORAGE SYSTEM", the entirety of which is incorporated herein by reference.

FIELD OF THE INVENTION

The present invention relates to a cloud storage field. More particularly, it relates to a method and an apparatus for performing authorization control in a cloud storage system.

BACKGROUND OF THE INVENTION

A safe multi-user memory system needs performing authorization control such that a user can only access files which he/she has the authorization to access. The access here is a broad concept, including any operation to a file, such as read, write, copy, delete, etc. In a traditional multi-user memory system, the file system maintains authorization information so as to record which files a user or user group may access, or which user or user group may access the file. The authorization information is generally saved in the memory system in a form of access control list, the access control list comprising a triple including user ID—file ID—access authorization. When a user attempts to access a file, the file system searches the access control list based on the user ID and file ID to obtain corresponding authorization, thereby determining whether the user has a right to perform the access operation to the file. Besides the above-mentioned online authorization control, offline authorization control may also be performed. Any access to the file by the user is recorded in an access log, and the offline authorization control is to determine whether an access violating the access authorization has occurred by checking the access log.

Different from storing a file on a physical memory node in a traditional multi-user memory system, the cloud storage system divides a file into a plurality of file blocks which may be stored on different physical memory nodes constituting the cloud storage system. A management node of the cloud storage system, for example, a name node, records how many file blocks a file is divided into and storage locations of these file blocks. This information is called mapping information. An administrator of the cloud storage system may generally retrieve the mapping information. For a user of cloud storage, the storage locations of the file blocks are shielded. In other words, a user of cloud storage only knows that the file has been stored in the cloud storage system. When a user needs accessing the file, the management node of the cloud storage system retrieves these file blocks from the storage locations of the file blocks that constitute the file to provide them to the user based on the records. If the user needs to access the whole file, the management node of the cloud storage system merges these file blocks into one file and then provides the file to the user; and if the user needs to access a part of the file, then the cloud storage management system may retrieve only file blocks corresponding to the part and provide them to the user. It is seen that the cloud storage system is different from a traditional memory system. Therefore, a solution is desired for performing authorization control that considers characteristics of the cloud storage system.

SUMMARY OF THE INVENTION

In view of the above, embodiments of the present invention provide a method and an apparatus for performing authorization control in a cloud storage system.

Embodiments of the present invention provide a method for performing authorization control on access to a file block, comprising: receiving an access request to the file block, wherein the file block is embedded with tag data comprising at least file block authorization information; retrieving the file block; extracting the file block authorization information from the tag data; determining whether the access request matches the file block authorization information; and performing the access request if the access request matches the file block authorization information.

Embodiments of the present invention provide an apparatus for performing authorization control on access to a file block, comprising: a receiving module configured to receive an access request to a file block, wherein the file block is embedded with tag data comprising at least file block authorization information; a retrieving module configured to retrieve the file block; an extracting module configured to extract the file block authorization information from the tag data; a determining module configured to determine whether the access request matches the file block authorization information; and a performing module configured to perform the access request if the access request matches the file block authorization information.

With the technical solutions of the embodiments according to the present invention, authorization control may be performed to a file block operation such as a backup operation because the file block itself carries file block authorization information, which solves the problem that a traditional authorization control method cannot perform authorization control to such access type as the backup operation. Besides, embodiments of the present invention further provide a specific method of embedding the file block authorization information, such that this technical solution has a better performance when being implemented.

DETAILED DESCRIPTION OF EMBODIMENTS

Figure 1:
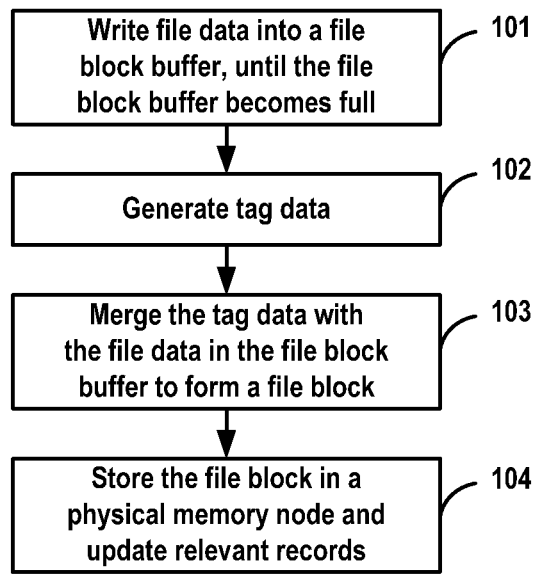
FIG. 1 illustrates a method for generating a file block according to one embodiment of the present invention.

Hereinafter, embodiments of the present invention will be described with reference to the accompanying drawings. In the following description, many specific details are illustrated so as to understand the present invention more comprehensively. However, the skilled in the art would appreciate that implementation of the present invention may not have some of these specific details, and the present invention is not limited to the particular embodiments as introduced. On the contrary, arbitrary combinations of the following features and elements may be considered to implement the present invention, regardless of whether they relate to different embodiments or not. Thus, the following aspects, features, embodiments and advantages are only for illustrative purposes, and should not be understood as elements or limitations of the appended claims, unless otherwise explicitly specified in the claims. It should be further noted that in order to prevent the present invention to be blurred due to unnecessary details, only apparatus structures and/or processing steps closely related to the solution according to the present invention are illustrated in the accompanying drawings, while other details having little relation with the present invention are omitted. Additionally, unless deliberately limited with "direct" or "indirect," the term "connection" in the present application documents includes otherwise both direct connection and indirect connection.

In a cloud storage system, in order to minimize the possibility of data loss, a backup operation is essential. As previously mentioned, a file is divided into a plurality of file blocks in a cloud storage system; the file blocks may be located at different physical memory nodes. Thus, the backup operation is actually performed on the basis of file blocks instead of the file. More specifically, one backup operation may back up a plurality of file blocks belonging to different files, while respective file blocks of a same file may be backed up in different backup operations. As previously mentioned, a traditional authorization control method is based on the file. More specifically, based on authorization information, it can only be determined which file may be accessed by a user or user group, or which user or user group may access the file; however, based on the authorization information, it cannot be determined which file block may be accessed by the user or user group, or which user or user group may access the file block. Thus, in a cloud storage system, it is impossible for a traditional authorization control method to perform authorization control on such access type as backup operation.

The backup operation is generally automatically performed by management software of the cloud storage system, or manually performed by an administrator of the cloud storage system. As previously mentioned, an administrator may also retrieve mapping information. The following circumstances are considered: the administrator of the cloud storage system first determines storage locations of respective file blocks of a file based on the mapping information; then the administrator copies these file blocks to a non-controlled memory system connected to the outside of the cloud storage system based on a manual backup process or an adjusted automatic backup policy, or first copies the file blocks from a high security level area of the cloud storage system to a low security level area, and then copies them to the non-controlled memory system; and in the non-controlled memory system, these file blocks are combined into a file. Because the traditional authorization control method cannot perform authorization control on the backup operation in a cloud storage system, the above actions of the administrator will not be detected as illegal access by the traditional access control method. Those skilled in the art may understand, the authorization control method in the cloud storage system has no effect on the non-controlled memory system. In this way, the administrator will get a duplicated copy of the file, which therefore affects the security of the cloud storage system.

A bug of a traditional authorization control method has been described above with the backup operation as an example. Those skilled in the art may understand, as long as an operation is based on file blocks instead of the file, the traditional authorization control method cannot perform authorization control on this operation.

A simple and intuitive solution is to encrypt the file first and then divide it into file blocks, or encrypt respective file blocks after dividing the file into file blocks. However, this solution is quite burdensome to both the cloud storage system and the user. The encryption operation needs consumption of considerable hardware resources, while entering a password each time the user accesses the file will seriously dampen the user's experience.

Hereinafter, a step of generating file blocks in a method for authorization control according to one embodiment of the present invention will be first described with reference to FIG. 1.

At step 101, file data are written into a file block buffer until this file buffer becomes full.

As previously mentioned, in the cloud storage system, the file is divided into a plurality of file blocks which are then stored in different physical memory nodes constituting the cloud storage system. As described hereinafter in detail, a file block generated according to one embodiment of the present invention not only comprises file data, but also tag data. Thus, the step 101 is actually to prepare file data for a file block.

Generally, a cloud storage system adopts a file block with a fixed data volume for facilitating management. Those skilled in the art may also adopt any other method of determining file block data volume, for example, adaptively adjusting the data volume of the file block based on some parameters. For the sake of simplicity, depiction is made hereinafter with a file block with a fixed data volume as an example.

At step 102, tag data comprising at least file block authorization information is generated.

Those skilled in the art may conceive of many methods to design a format of the file block authorization information. For example, the file block authorization information may record a user ID of a file block owner, wherein the owner of the file block may typically perform any operation to the file block, while those not being the owner of the file block can only perform some particular operations to this file block based on their authorization, or even cannot perform any operation. The file block authorization information may also record the access authorization of other user who is not the owner of the file to this file block, thereby prescribing which user may perform what operation to this file block. Different from a traditional access control list, file block authorization information may only record a two-tuple of user ID—access authorization.

The file block authorization information may also record a security level of this file block, wherein the security level limits the area to which the file block may be stored or copied, such that the file block can only be stored in an area with a prescribed security level or higher, and meanwhile the file block can only be copied to an area with a prescribed security level or higher. Therefore, any attempt to copy the file block to an area with a lower security level will be deemed as illegal access. Thus, the administrator of the cloud storage system cannot copy this file block to a non-controlled memory system connected to the outside of the cloud storage system, or copy the file block first from a high security level area of the cloud storage system to a lower security level area for substantially copying it to the non-controlled memory system.

By embedding the file block authorization information as a tag into the file block, it is possible to determine, before performing a file block-based operation, whether the operation conforms to a prescription on this file block authorization information based on the embedded file block authorization information. However, the embedded file block authorization information might be tampered, such that the authorization control can not be correctly performed based on the tampered file block authorization information.

According to one embodiment of the present invention, the tag information further comprises digest information. The digest here refers to a set of dependent variable information generated by performing hashing calculation to independent variable information according to a certain algorithm. The dependent variable information varies with the independent variable information. With the file block authorization information as the independent variable information, the generated digest may provide integrity protection for the file block authorization information. Of course, the digest may also be generated by calculating the data obtained after merging the file data and the file block authorization information. However, generating a digest is well known in the art, for example, by algorithms such as SHA-1, MD5, HAVAL-128, MD4, and RIPEMD, which will not be detailed here.

At step 103, a file block is formed by merging the tag data with the file data in the file buffer.

It is easily understood that the data volume of tag data plus the data volume of the file buffer should be equal to the data volume of the file block. After the content and format of the tag data are fixed, the data volume of the tag data will be fixed. In a scenario of employing a file block with a fixed data volume, the data volume of the file buffer is the data volume of the file block subtracted by the data volume of the tag data. In other words, the data volume of the file buffer may be adjusted based on the data volume of the file block and the data volume of the tag data.

Because the tag data embedded in the file block need to act as the basis for authorization control when performing operation on the file block, it must be identifiable by a module performing authorization control. In other words, it is required to identify the tag data in the file block in a certain manner. There are two methods capable of identifying the tag data in the file block. One method is to adopt a fixed bit string to identify the tag data such that the module for performing authorization control deems having found the tag data upon detecting the fixed bit string through scanning the file block. An advantage of this method is to provide a greater flexibility upon embedding the tag data. The other method is to embed the tag data into a fixed position of the file block such that the module for performing authorization control may find the tag data at this position of the file block. An advantage of this method is to avoid adding additional data into the file block.

At step 104, the file block is stored at a physical memory node with relevant records being set.

The records to be set, for example, comprise the mapping information.

Generally, steps 101 to 104 relate to embedding file block authorization information in the file block when generating the file block.

According to one embodiment, when a user having the authorization to operate the file, for example, the file owner, needs to operate the file, the cloud storage system, based on mapping information, retrieves file blocks constituting the file from physical memory nodes and strips tag data from the file blocks, and then merges the remaining file data into a file to provide it to the user; after the operation to the file by the user is over, the file is divided into file blocks embedded with tag data according to steps 101 to 104, and then the file blocks are stored at the physical memory nodes. In this way, each time the user accesses the file, it is required to perform the above merge and division, and the above stripping and embedding need to be performed for each file block, which therefore increases the burden on the cloud storage system.

According to another embodiment of the present invention, the above stripping and embedding operations are only performed to the file blocks where the file data to be accessed by the user are located. Apparently, it may reduce the burden on the cloud storage system. However, because of an inherent mechanism of a cloud storage system, this solution might conflict with a solution of embedding tag data into a fixed position of the file block. For example, if the above stripping and embedding operations are performed only to the file blocks where the file data to be accessed by the user are located, the modification to the file by the user might result in that the tag data will not be located at a fixed position of the file block any more. Hereinafter, detailed analysis is made with reference to FIGS. 2(A) to 2(C).

Figure 2A:
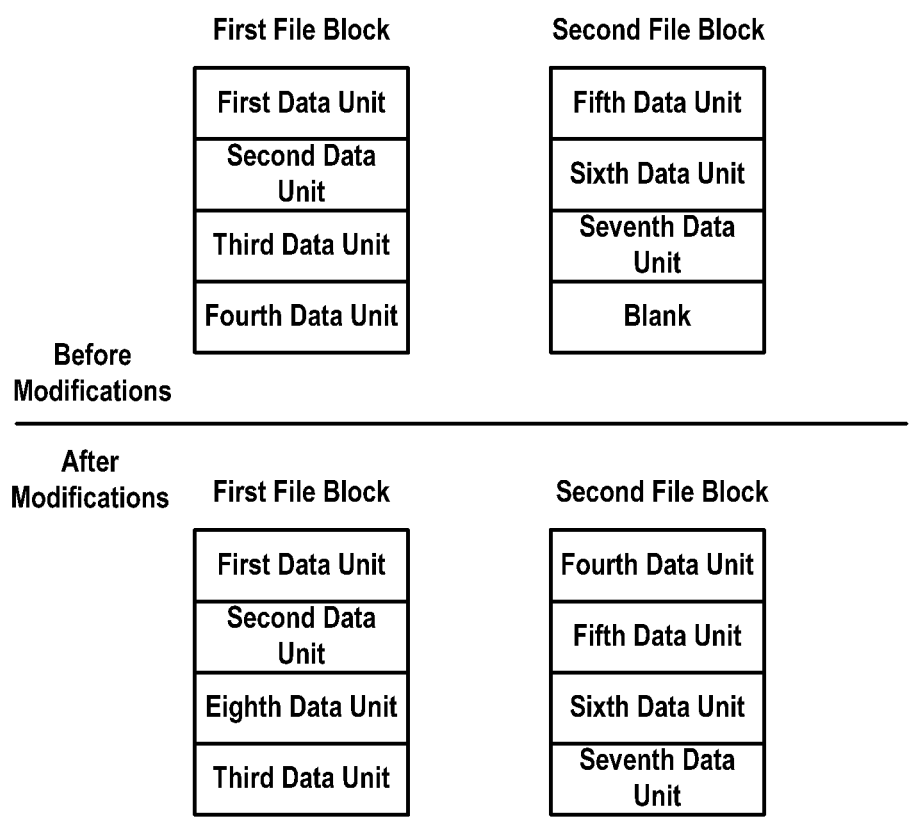
FIGS. 2A, 2B and 2C, taken together, illustrate a change of a file block before and after user modifications.

FIG. 2(A) illustrates changes of a file block before and after the user increases file data to the file block so as to describe the inherent mechanism of the cloud storage system. Herein, suppose the file comprises two file blocks, namely a first file block and a second file block. The data volume of the file blocks is fixed, namely four data units. The size of the data units here may be set arbitrarily. For example, a data unit may be 4 M bytes, 16 M bytes, or one byte, etc. As illustrated in FIG. 2(A), before the user's modification, the data volume of the file is 7 data units, wherein the first file block comprises 4 data units, and the second file block comprises 3 data units. The user's modification lies in that an eighth data unit has been added between the second data unit and the third data unit. According to the inherent mechanism of the cloud storage system, file data must be deposited continuously in the file block; thus, the eighth data unit is not only logically located between the second data unit and the third data unit, and its location in the file block must be between the second data unit and the third data unit. Since the data volume of the file block is fixed to 4 data units, the fourth data unit which was originally located at the rearmost section of the first file block is "extruded" into the second file block and located at the frontmost section of the second file block.

Figure 2B:
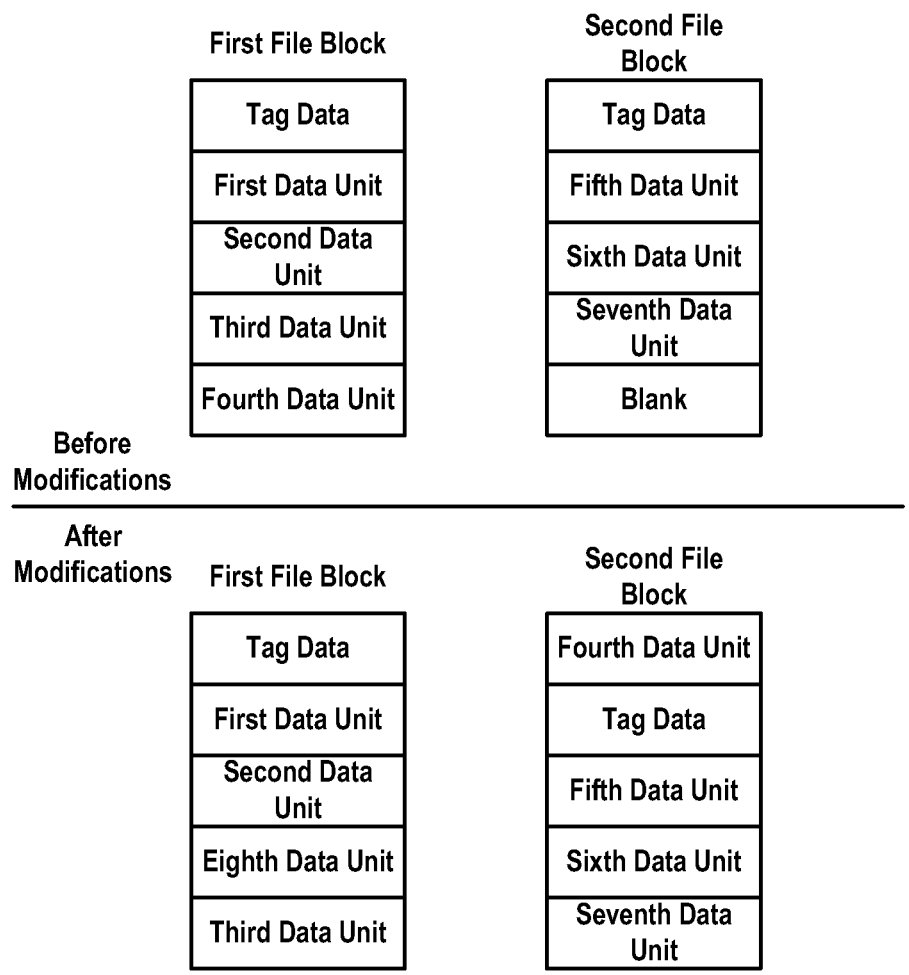

FIG. 2(B) illustrates in this inherent mechanism, how the modification to the file by the user might result in that the tag data will not be located at a fixed position of a file block any more, if the above stripping and embedding operations are only performed to the file block where the file data to be accessed by the user are located. FIG. 2(B) is similar to FIG. 2(A), and the difference therebetween is that the data volume of the file block is fixed to 5 data units. Besides, suppose the data volume of tag data carried in the file block is one data unit. According to the principle as depicted in FIG. 2(A), if the user adds the eighth data unit between the second data unit and the third data unit, the fourth data unit originally located at the rearmost section of the first file block is "extruded" into the second file block, based on the inherent mechanism of the cloud storage system. Since the second file block is not subjected to the stripping and embedding operations, the tag data of the second file block is only regarded as a common data unit; then the fourth data unit, after being "extruded" into the second file block, is not located after the tag data of the second file block, but located at the frontmost section of the second file block. Thus, the tag data will not be located at the frontmost section of the second file block any more.

Likewise, as illustrated in FIG. 2 (C), if the user deletes the fourth data unit from file data of the first file block, then the tag data in the second file block will be "absorbed" into the first file block as a data unit, thereby resulting in that the second file block does not include tag data.

Those skilled in the art may understand, if the file includes a third file block, the second file block will have no blank before modification. After modification, not only the tag data of the second file block is not located at the frontmost section of the file block any more, the tag data of the third file block will not be located at the frontmost section of the file block any more. Likewise, if the modification causes change of data volume of the file data in a file block, tag data of all file blocks after this file block will not be located at the frontmost section of the file block any more. The first file block being after the second file block here means that the location of the file data of the first file block in the respective file is more proximate to the end of the file compared to the location of the file data of the second file block in the respective file.

Figure 3:
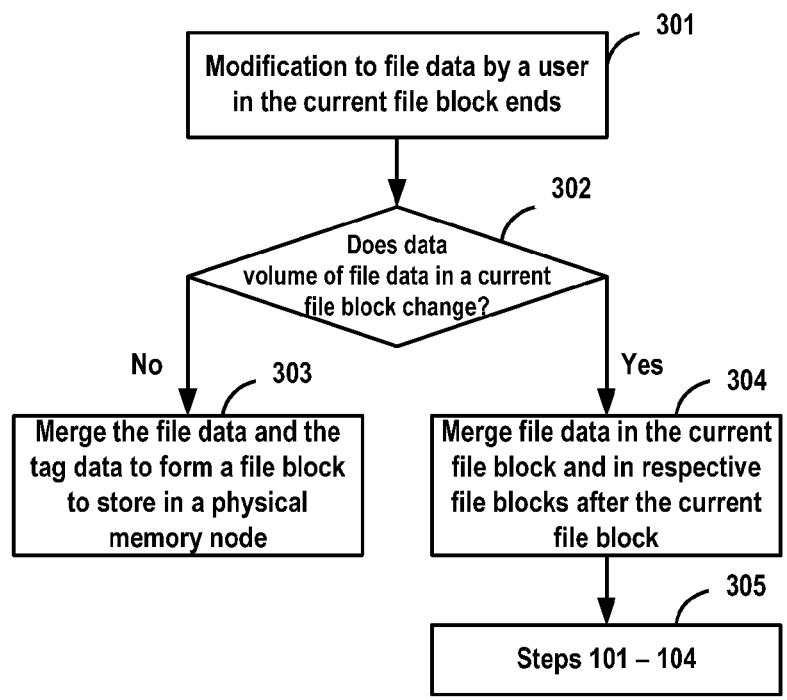
FIG. 3 illustrates a processing flow after user modifications according to one embodiment of the present invention.

In order to solve this problem, according to one embodiment of the present invention, the method illustrated in FIG. 3 may be adopted.

At step 301, the modification to file data in a current file block by the user ends.

Here, the current file block refers to the file block where the file data accessed by the user are located. The current file block may be one file block, or two or more file blocks.

At step 302, whether the modification to the file by the user has caused change of the data volume of the file data in the current file block is determined; if it changes, then the process proceeds to step 304, otherwise, proceeds to step 303.

At step 303, since the modification to the file by the user does not cause change of the data volume of the file data in the current file block, it will not cause change of locations of tag data of other file blocks. At this time, it is only required to merge the user-modified file data with the tag data to be an updated current file block to store.

At steps 304 and 305, if the modification to the file by the user causes change of the data volume of file data in the current file block, as previously mentioned, all locations of tag data of respective file blocks after the current file block will change. In order to avoid this change, the file data in the current file block and those in the respective file blocks after the current file block are merged, and then the merged file data are processed according to steps 101 to 104.

Figure 4:
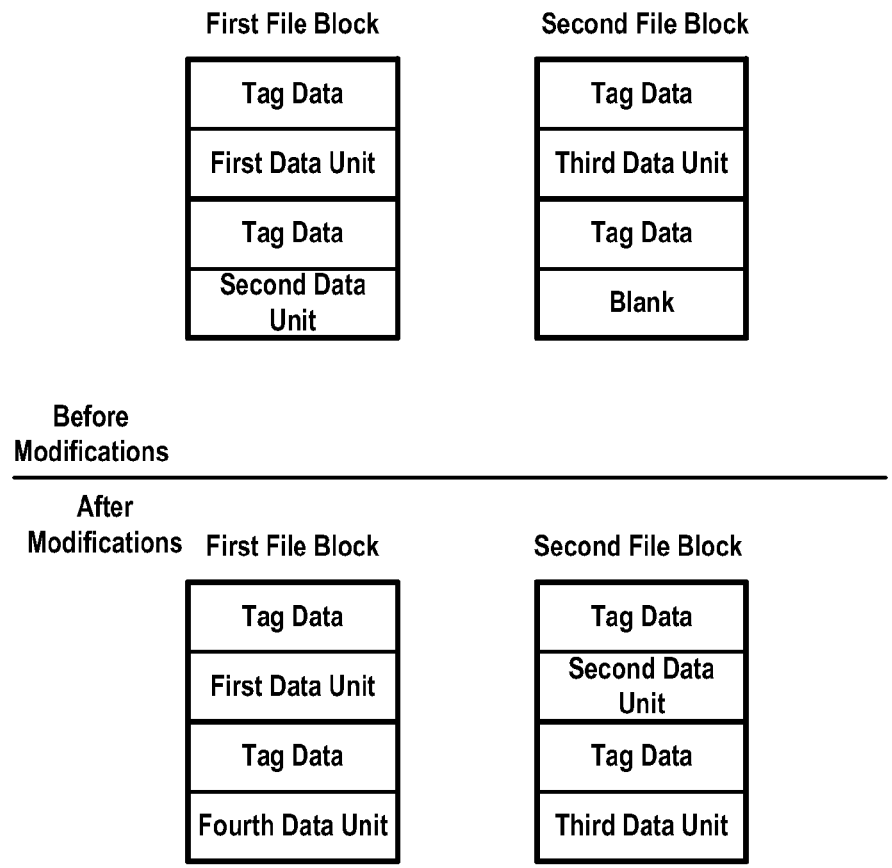
FIG. 4 illustrates a change of a file block before and after user modifications.

According to another embodiment of the present invention, the above problem may be solved by a method of periodically embedding tag data in the file block. As illustrated in FIG. 4, in every two data units, one is a tag data, then the period is two data units, and thus the period is two data units indicated by bold frames. Besides periodically embedding tag data in the file block, it is further required to prescribe that the "extruding" and "absorbing" operations must be performed with the period as the minimal unit. In this way, as illustrated in the figure, the user adds a fourth data unit between the first data unit and the second data unit, but since the second data unit and the tag data immediately followed by the second data unit are "extruded" together into the second file block, the locations of the tag data in the first file block and the second file block will not change.

Figure 2C:
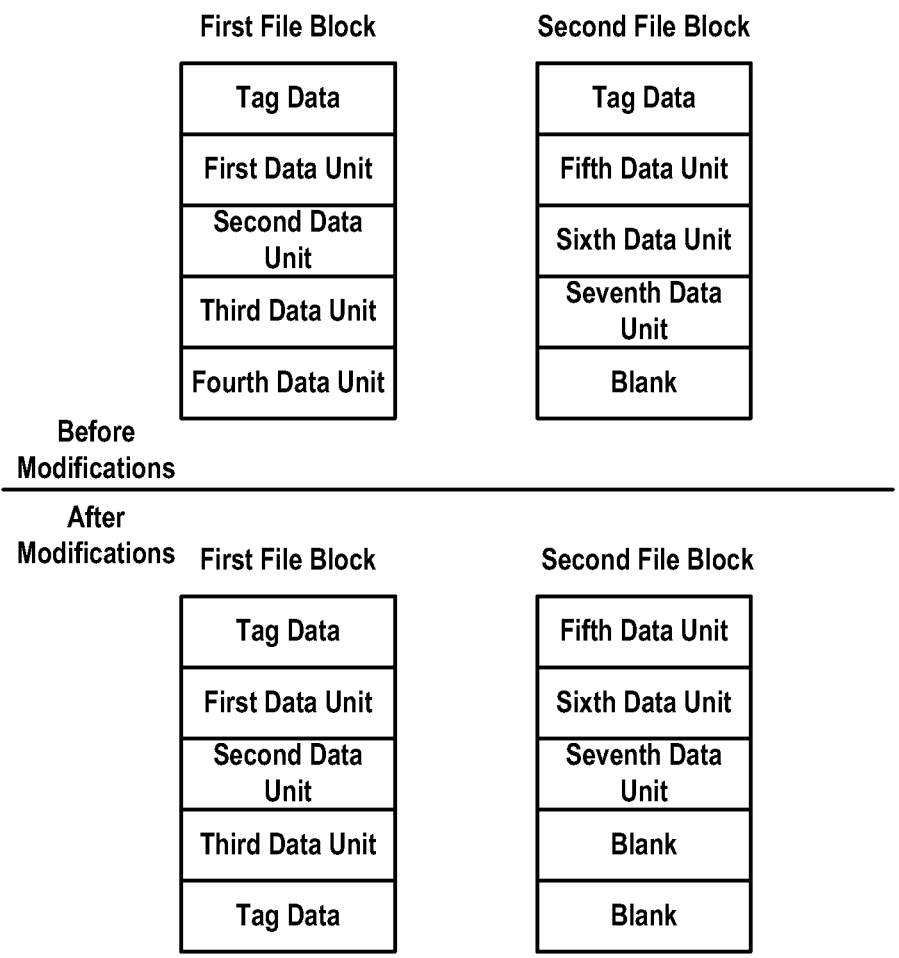

In fact, in FIGS. 2(A)-(C), to embed a tag data at a fixed position of the file block is an extreme scenario when the period is equal to the data volume of the file block. However, in FIGS. 2(A)-(C), the minimal unit for performing the "extruding" and "absorbing" is not the period; thus, it cannot be guaranteed that the locations of tag data in the file blocks will not change in FIGS. 2(A)-2(C).

Hereinafter, how to set the period will be described. Apparently, the period should not be greater than the data volume of the file block. In particular, when the ratio of the data volume of the file block to the period is a natural number power of 2, it would be advantageous in the aspect of computation. Second, since "extruding" and "absorbing" operations are performed with the period as the minimal unit, the period is further required to be adapted to a minimal data volume variation unit of the file data in the file block. Specifically, the period should not be greater than the minimal data volume variation unit of the file data in the file block. For example, suppose the minimal data volume variation unit of file data is one byte. Namely, if the user tends to increase the file data, he/she increases at least by one byte; and if the user tends to decrease the file data, he/she decreases at least by one byte. In this case, to set the period to file data only comprising one byte, half byte (4 bits), quarter byte (2 bits) or one eighth byte (1 bit) can guarantee that the location of the tag data in the file block will not change.

In a practical cloud storage system, there are varieties of file types, and the minimal data volume variation units of the file data are always different when various kinds of files are modified. Thus, generally a uniform value, which can guarantee that the locations of the tag data in the file blocks for all kinds of file types unchanged, cannot be obtained. Besides, setting the period further requires considering another factor—utilization efficiency of memory capacity. If the period is set too short, then too many tag data exist in the file block, which will decrease the utilization efficiency of memory capacity.

Inventors of the present invention find through studies that when the data volume of the file block is fixed and a data volume of a quarter of the file block to one sixteenth file block is adopted as the period, a better tradeoff between intactness of the tag data location of the file block and the utilization efficiency of the memory capacity may be guaranteed. Regarding a currently popular 64 M byte file block, 16 M bytes, 8 M bytes, or 4 M bytes is adopted as the period. When the period is successfully set, for a particular file, even if the data volume of file data increased or decreased by user's modification to the file is less than the period, the "extruding" and "absorbing" operations need to be performed with the period as the minimal unit.

Figure 5:
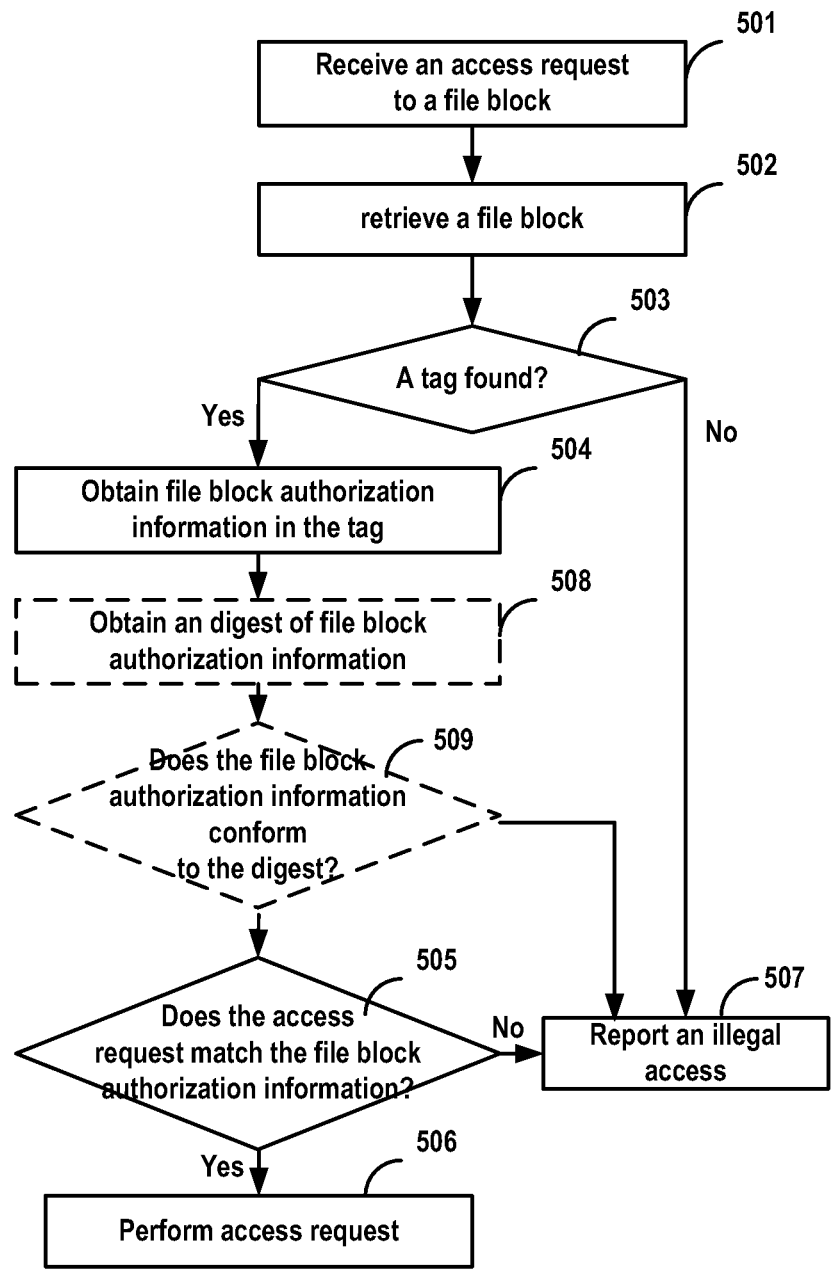
FIG. 5 illustrates a method for accessing a file block according to one embodiment of the present invention.

How to embed the tag data in the file block has been described above. FIG. 5 depicts how to perform authorization control based on the tag data.

At steps 501-502, an access request to a file block is received, and the file block is retrieved.

At step 503, whether tag data are found from the retrieved file block is determined; if the tag data are found, then the process proceeds to step 504; otherwise, it proceeds to step 507.

As previously mentioned, tag data may be found by detecting a fixed bit string or performing a search at a fixed location of the file block. If no tag data are found, it indicates that the file block authorization information is damaged, thereby illegal access is reported at step 507.

At step 504, file block authorization information in the tag data is obtained.

Steps 508 and 509 are optional. If the tag data generated at step 102 further comprises an digest of the file block authorization information, the digest is extracted from the tag data, and whether the file block authorization information conforms to the digest is compared. If they do not conform to each other, it indicates that the file block authorization information is tampered, thereby an illegal access is reported at step 507. How to determine whether the information is tampered through an digest of a segment of information is common knowledge in the art, which will not be detailed here.

At step 505, whether the access request conforms to the file block authorization information is determined. If they conform, the access request is performed at step 506; otherwise an illegal access is reported at step 507.

The type of operation and the user ID issuing the access request may be obtained from the access request. As previously mentioned, the file block authorization information records a two-tuple of user ID—access authorization; thus, it may be determined based on the type of operation and the user ID issuing the access request that whether the access request conforms to file block authorization information.

In particular, if the file block authorization information further records the security level of the file block, any attempt to copy the file block to an area with a lower security level may be identified based on the security level, which only requires a determination of whether the security level of the target area of the copy operation is lower than the appointed security level.

Those skilled in the art may understand that step 507 is optional. Steps 501-506, or together with steps 508-509 in fact can already prevent illegal access to a file block. In other words, they can already perform an online authorization control of the file block. Reporting an illegal access may be performed upon finding an illegal access or performed in an offline manner, as illustrated at step 507 in the figure. As previously mentioned, any access to a file by a user will be recorded in an access log. Likewise, any access to a file block by a user will be recorded in the access log. Whether there is ever an illegal access to a file block may be determined by looking up the access log and comparing whether an operation to the file block as recorded in the access log conforms to the file block authorization information embedded in the file block.

Figure 6:
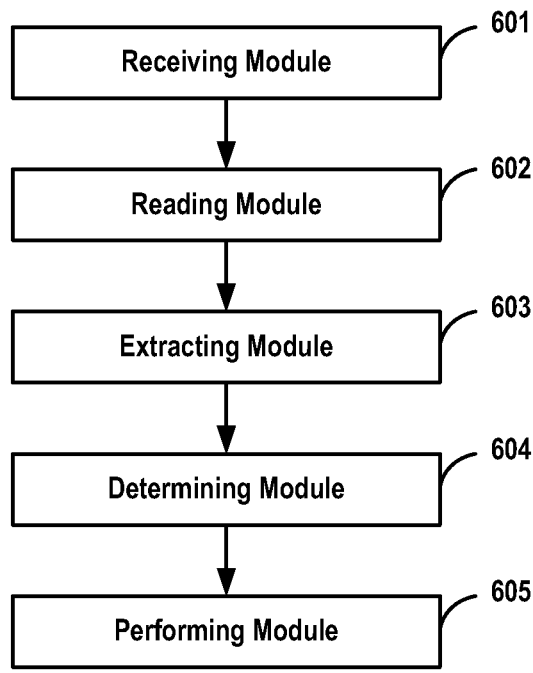
FIG. 6 illustrates an apparatus for performing authorization control on access to file blocks according to one embodiment of the present invention.

FIG. 6 illustrates an apparatus for performing a authorization control on an access to file blocks according to one embodiment of the present invention, the apparatus comprising:

A receiving module 601 is configured to receive an access request to a file block, wherein the file block is embedded with tag data comprising at least file block authorization information.

a retrieving module 602 is configured to retrieve the file block;

an extracting module 603 is configured to extract the file block authorization information from the tag data;

a determining module 604 is configured to determine whether the access request matches the file block authorization information; and a performing module 605 is configured to perform the access request when the access request matches the file block authorization information.

Those having ordinary skill in the art may understand that the above method and system may be implemented with a computer-executable instruction and/or in a processor controlled code, for example, such code is provided on a bearer medium such as a magnetic disk, CD, or DVD-ROM, or a programmable memory such as a read-only memory (firmware) or a data bearer such as an optical or electronic signal bearer. The apparatuses and their components for processing information in these embodiments may be implemented by hardware circuitry of a programmable hardware device such as a very large scale integrated circuit or gate array, a semiconductor such as logical chip or transistor, or a field-programmable gate array, or a programmable logical device, or implemented by software executed by various kinds of processors, or implemented by combination of the above hardware circuitry and software.

Although a plurality of exemplary embodiments of the present invention have been illustrated and depicted, the skilled in the art would appreciate that without departing from the principle and spirit of the present invention, change may be made to these embodiments, and the scope of the present invention is limited by the appending claims and equivalent variation thereof.

What is claimed is:

1. A method of performing authorization control on file block access, comprising:
   dividing a file into a plurality of file blocks;
   embedding tag data including at least file block authorization information into each file block;
   receiving an access request to a component of a file comprising a file block comprising file data, wherein the file block is embedded with tag data comprising at least file block authorization information;
   retrieving the file block;
   extracting the file block authorization information from the tag data;
   determining whether the access request matches the file block authorization information; and
   performing the access request if the access request matches the file block authorization information.

2. The method according to claim 1, wherein the file block is periodically embedded with the tag data.

3. The method according to claim 2, wherein the period is any one of:
   a quarter of a file block data volume, one eighth of a file block data volume, and one sixteenth of a file block data volume.

4. The method according to claim 1, wherein the tag data further comprises digest information of the file block authorization information.

5. The method according to claim 4, further comprising:
   extracting the digest information;
   determining whether the file block authorization information conforms to the digest information; and
   determining whether the access request matches the file block authorization information if the file block authorization information conforms to the digest information.

6. The method according to claim 1, wherein the file block comprises file data, and the file block is a component of a file, and performing the access request comprises:
   merging the file data in file blocks that constitute the file so as to perform an operation with respect to the file; and
   after completion of the operation with respect to the file, embedding the tag data into the file blocks upon dividing the merged file data file into file blocks for storing.

7. The method according to claim 6, wherein merging the file data in the file blocks that constitute the file into the file so as to perform the operation with respect to the file comprises:

determining file blocks involved in the operation with respect to the file; and merging only the file data in the involved file blocks so as to perform the operation with respect to the file.

8. The method according to claim 7, further comprising:
determining whether the operation with respect to the file causes a change of data volume of file data in the involved file blocks; and merging file data of the involved file blocks and the subsequent file blocks if the data volume changes.

9. A computer apparatus for performing authorization control on file block access, comprising:
a computing system with at least one processor and memory;
a receiving module executing in the memory and configured to receive an access request to a component of a file comprising a file block comprising file data, wherein the file block is embedded with tag data comprising at least file block authorization information;
a retrieving module executing in the memory and configured to retrieve the file block;
an extracting module executing in the memory and configured to extract the file block authorization information from the tag data;
a determining module executing in the memory and configured to determine whether the access request matches the file block authorization information; and
a performing module executing in the memory and configured to perform the access request if the access request matches the file block authorization information.

10. The apparatus according to claim 9, wherein the file block is periodically embedded with the tag data.

11. The apparatus according to claim 10, wherein the period is any one of:
a quarter of a file block data volume, one eighth of a file block data volume, and one sixteenth of a file block data volume.

12. The apparatus according to claim 9, wherein the tag data further comprises digest information of the file block authorization information.

13. The apparatus according to claim 12, further comprising:
a module executing in the memory and configured to extract the digest information;
a module executing in the memory and configured to determine whether the file block authorization information conforms to the digest information; and
a module executing in the memory and configured to determine whether the access request matches the file block authorization information if the file block authorization information conforms to the digest information.

14. The apparatus according to claim 9, wherein the file block comprises file data, and the file block is a component of the file, and the performing module comprises:
a module executing in the memory and configured to merge the file data in file blocks that constitute the file so as to perform an operation with respect to the file; and
a module executing in the memory and configured to, after completion of the operation with respect to the file, embed the tag data into the file blocks upon dividing the merged file data file into file blocks for storing.

15. The apparatus according to claim 14, wherein the module configured to merge the file data in file blocks that constitute the file into the file so as to perform the operation with respect to the file comprises:
a module executing in the memory and configured to determine file blocks involved in the operation with respect to the file; and
a module executing in the memory and configured to merge only the file data in the involved file blocks so as to perform the operation with respect to the file.

16. The apparatus according to claim 15, further comprising:
a module executing in the memory and configured to determine whether the operation with respect to the file causes a change of data volume of file data in the involved file blocks; and
a module executing in the memory and configured to merge the file data of the involved file blocks and the subsequent file blocks if the data volume changes.

17. A computer program product configured to perform authorization control on file block access, the computer program product comprising:
a non-transitory bearer medium having processor executable instructions stored therein, the processor executable instructions embodied within computer readable program code, the computer readable program code comprising:
computer readable program code for dividing a file into a plurality of file blocks;
computer readable program code for embedding tag data including at least file block authorization information into each file block;
computer readable program code for receiving an access request to a component of a file comprising a file block comprising file data, wherein the file block is embedded with tag data comprising at least file block authorization information;
computer readable program code for retrieving the file block;
computer readable program code for extracting the file block authorization information from the tag data;
computer readable program code for determining whether the access request matches the file block authorization information; and
computer readable program code for performing the access request if the access request matches the file block authorization information.

18. The computer program product according to claim 17, wherein the file block is periodically embedded with the tag data.

19. The computer program product according to claim 17, wherein the period is any one of:
a quarter of a file block data volume, one eighth of a file block data volume, and one sixteenth of a file block data volume.

20. The computer program product according to claim 17, wherein the tag data further comprises digest information of the file block authorization information.

21. The computer program product according to claim 20, further comprising:
computer readable program code for extracting the digest information;
computer readable program code for determining whether the file block authorization information conforms to the digest information; and
computer readable program code for determining whether the access request matches the file block authorization information if the file block authorization information conforms to the digest information.

22. The computer program product according to claim 17, wherein the file block comprises file data, and the file block is a component of a file, and the computer readable program code for performing the access request comprises:
   computer readable program code for merging the file data in file blocks that constitute the file so as to perform an operation with respect to the file; and
   computer readable program code for, after completion of the operation with respect to the file, embedding the tag data into the file blocks upon dividing the merged file data file into file blocks for storing.

23. The computer program product according to claim 22, wherein the computer readable program code for merging the file data in the file blocks that constitute the file into the file so as to perform the operation with respect to the file comprises:
   computer readable program code for determining file blocks involved in the operation with respect to the file; and
   computer readable program code for merging only the file data in the involved file blocks so as to perform the operation with respect to the file.

24. The computer program product according to claim 23, further comprising:
   computer readable program code for determining whether the operation with respect to the file causes a change of data volume of file data in the involved file blocks; and
   computer readable program code for merging file data of the involved file blocks and the subsequent file blocks if the data volume changes.

* * * * *